United States Patent
Liu et al.

(10) Patent No.: US 9,846,518 B2
(45) Date of Patent: Dec. 19, 2017

(54) IN-CELL TOUCH DISPLAY PANEL

(71) Applicant: MStar Semiconductor, Inc., Hsinchu Hsien (TW)

(72) Inventors: Chi Kang Liu, Hsinchu County (TW); Guo-Kiang Hung, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 118 days.

(21) Appl. No.: 14/881,290

(22) Filed: Oct. 13, 2015

(65) Prior Publication Data

US 2016/0109994 A1   Apr. 21, 2016

Related U.S. Application Data

(60) Provisional application No. 62/065,021, filed on Oct. 17, 2014.

(51) Int. Cl.
  *G06F 3/044* (2006.01)
  *G06F 3/041* (2006.01)

(52) U.S. Cl.
  CPC ............ *G06F 3/044* (2013.01); *G06F 3/0412* (2013.01); *G06F 3/0416* (2013.01); *G06F 2203/04112* (2013.01)

(58) Field of Classification Search
  CPC combination set(s) only.
  See application file for complete search history.

(56) References Cited

U.S. PATENT DOCUMENTS

2016/0070395 A1*  3/2016  Hung ................... G09G 5/003
                                                                  345/173

FOREIGN PATENT DOCUMENTS

TW    201020890    6/2010
TW    201044244    12/2010

* cited by examiner

*Primary Examiner* — Robin J Mishler
(74) *Attorney, Agent, or Firm* — WPAT, PC

(57) ABSTRACT

An in-cell touch display panel includes a substrate, a semiconductor stack, a transparent layer, an insulation layer, and a metal layer. The semiconductor stack is disposed on the substrate, and includes a plurality of pixel control elements. The transparent layer is disposed on the semiconductor layer stack, and includes a plurality of first touch electrode portions and a plurality of first connecting lines extending along a first direction. The insulation layer is disposed on the transparent layer. The metal layer is disposed on the insulation layer, and includes a plurality of second touch electrode portions and a plurality of second connecting lines extending along a second direction. The second connecting lines and the first touch electrode portions form a plurality of first touch electrode strips, and the first connecting lines and the second touch electrode portions form a plurality of second touch electrode strips.

10 Claims, 21 Drawing Sheets

IN-CELL TOUCH DISPLAY PANEL

This application claims the benefit of U.S. Provisional Application Ser. No. 62/065,021, filed Oct. 17, 2014, the subject matter of which is incorporated herein by reference.

BACKGROUND OF THE INVENTION

Field of the Invention

The invention relates in general to an in-cell touch display panel, and more particularly to an in-cell touch display panel that integrates a touch sensor in a display panel.

Description of the Related Art

As technologies continue to progress, touch panels featuring human-machine interactions are commonly applied as input interfaces at external ports of various apparatuses. In the recent years, with extensive developments and applications of consumer electronic products, the number of application products employing touch display devices that integrate touch control and display functions also continues to expand. Some examples of these application products include mobile phones, GPS navigation systems, tablet computers, personal digital assistants (PDAs), and laptop computers. A conventional touch display device is formed by directly adhering a touch panel with a display panel, and so the overall thickness and weight of the panels are greater than those of one single display panel, resulting in a burden in user portability. Therefore, there is a need for solution for reducing the thickness of a touch display panel.

SUMMARY OF THE INVENTION

It is a primary object of the present invention to provide an in-cell touch display panel. Without affecting the display function, the in-cell touch display panel realizes the touch function to increase element integration and lower production costs as well as to reduce the thickness and weight of the in-cell touch display panel at the same time.

To achieve the above object, the present invention provides an in-cell touch display panel. The inc-cell touch display panel includes a first substrate, a semiconductor stack, a transparent layer, an insulation layer and a metal layer. The semiconductor stack is disposed on the first substrate, and includes a plurality of pixel control elements. The transparent layer is disposed on the semiconductor layer, and includes a plurality of first touch electrode portions and a plurality of first connecting lines extending along a first direction. The insulation layer is disposed on the transparent layer. The metal layer is disposed on the insulation layer, and includes a plurality of second touch electrode portions and a plurality of second connecting lines extending along a second direction. Each of the second connecting lines is electrically connected to two adjacent first touch electrode portions disposed along the second direction, such that the second connecting lines and the first touch electrode portions form a plurality of first touch electrode strips. Each of the first connecting lines is electrically connected to two adjacent second touch electrode portions disposed along the first direction, such that the first connecting lines and the second touch electrode portions form a plurality of second touch electrode strips.

To achieve the above object, the present invention further provides an in-cell touch display panel having a transparent layer and a metal layer. The in-cell touch display panel includes a plurality of first display pixel units, a plurality of second display pixel units, a plurality of third display pixel units, a plurality of fourth display pixel units, and a plurality of fifth display pixel units. Each of the first display pixel units includes a first transparent segment disposed in the transparent layer, and a first metal segment disposed in the metal layer. Each of the second display pixel units includes a second transparent segment disposed in the transparent layer, and a second metal segment disposed in the metal layer. The second transparent segments are electrically connected to the second metal segments. Each of the third display pixel units includes a third transparent segment disposed in the transparent layer. Each of the fourth display pixel units includes a fourth transparent segment disposed in the transparent layer, and a third metal segment disposed in the metal layer. The fourth transparent segments are electrically connected to the third metal segments. Each of the fifth display pixel units includes a fourth metal segment disposed in the metal layer. The second transparent segments, the third transparent segments, the first metal segments and the second metal segments form a plurality of first touch electrode strips extending along a second direction. The first transparent segments, the fourth transparent segments, the third metal segments and the fourth metal segments form a plurality of second touch electrode strips extending along a first direction. The first touch electrode strips intersect and are insulated from the second touch electrode strips.

In the in-cell touch display panel of the present invention, a touch sensor may be disposed in the touch display panel, and the first touch electrode strips and the second touch electrode strips of the touch sensor may be formed via the first transparent layer and the first metal layer, thus eliminating an additional touch panel that directly adheres with the display panel. Therefore, costs as well as the thickness and weight of the in-cell touch display panel can be at the same time reduced.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
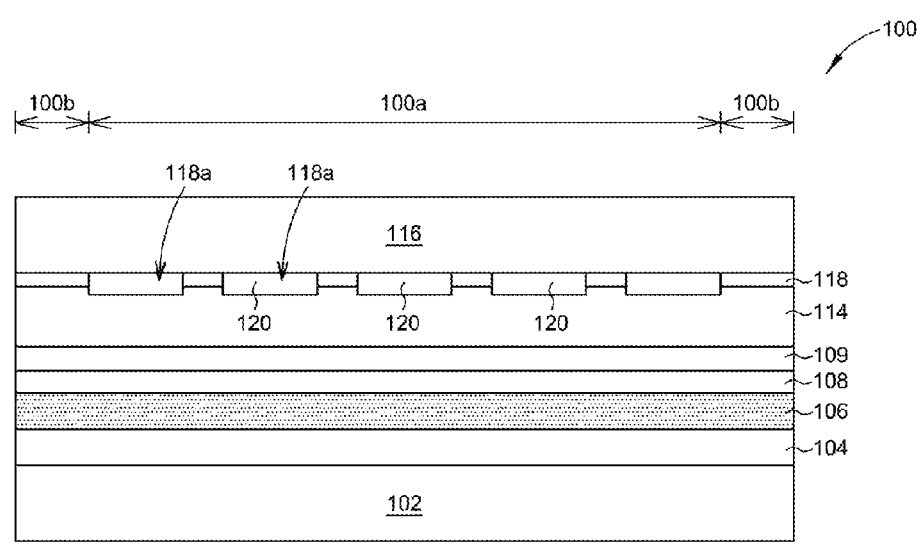
FIG. 1 is a section view of an in-cell touch display panel of the present invention.

Referring to FIG. 1, an in-cell touch display panel 100 according to an embodiment includes an active region 100a and a border region 110b. Elements for image display and touch functions are allocated in the active region 100a. The border region 100b may surround the active region 100a, and is for allocating circuits or control elements not to be seen by a user, such as peripheral circuits or driving elements, for example. The in-cell touch display panel 100 may include a first substrate 102, a semiconductor stack 104, a first transparent layer 106, a first insulation layer 108 and a first metal layer 109. The semiconductor stack 104 is disposed on the first substrate 102, and is utilized for transmitting image signals to be displayed by the in-cell touch display panel 100. The first transparent layer 106 is disposed on the semiconductor stack 104. The first insulation layer 108 is disposed on the first transparent layer 106. The first metal layer 109 is disposed on the first insulation layer 108. The first transparent layer 106 and the first metal layer 109 are electrically insulated via the first insulation layer 108, and may form capacitance coupling with each other to form a touch sensor. For example, the first transparent layer 106 may include a driving electrode, which is disposed in the active region 100a and utilized for transmitting a touch driving signal; the first metal layer 109 may include a sensing electrode, which is disposed in the active region 100a and utilized for sensing the coupling capacitance change. As such, the touch sensor is allowed to detect an approach of a touching object or a position of a touching object touching the in-cell touch display panel 100. In another embodiment, the driving electrode and the sensing electrode may be formed via the first metal layer 109 and the first transparent layer 106, respectively.

In the embodiment, the in-cell touch display panel 100 may be a liquid crystal display (LCD) panel, and may further include a liquid crystal layer 114 and a second substrate 116. The first substrate 102 and the second substrate 116 are disposed opposite each other, and the liquid crystal layer 114 is disposed between the first substrate 102 and the second substrate 116. As the semiconductor stack 104, the first transparent layer 106, the first insulation layer 108 and the first metal layer 109 are disposed between the first substrate 102 and the liquid crystal layer 114, the in-cell touch display panel 100 of the embodiment is capable of integrating the touch sensor therein so as to provide the in-cell touch display panel 100 with a touch function. The in-cell touch display panel 100 of the present invention is not limited to a LCD panel, and the display panel integrated with the touch sensor of the present invention may be another type of active array display panel, e.g., an organic light emitting diode (OLED) display panel.

The in-cell touch display panel 100 may further include a black matrix 118 and a plurality of color filter plates 120. The black matrix 118 and the color filter plates 120 are disposed on a surface of the second substrate 116 facing the liquid crystal layer 114. The black matrix 118 includes a plurality of first openings 118a located in the active region 100a. Each of the first openings 118a corresponds to a pixel region of the in-cell touch display panel 100, such that a light passing through each of the first openings 118a may form a pixel or a sub-pixel of an image. The black matrix 118 may be utilized to shield elements or circuits not be seen by a user. The color filter plates 120 are disposed on the second substrate 116 in the first openings 118a, and are utilized for determining a color of a light emitted from the pixel regions. It should be noted that, the first metal layer 109 forming a part of the touch sensor may be shielded by the black matrix 118 to remain unobserved by a user, so as to prevent the first metal layer 109 from limiting an area through which the light passes through the pixel regions, i.e., to prevent the first metal layer 109 from limiting an aperture ratio of the pixels.

Figure 2:
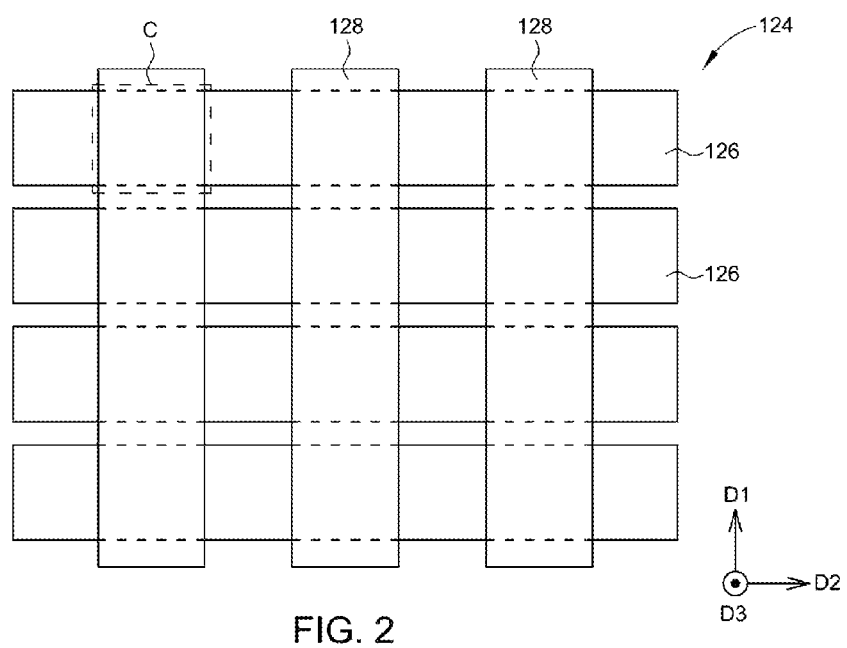
FIG. 2 is a top view of a touch sensor of the present invention.

Details of the touch sensor of the embodiment are given below. Referring to FIG. 2, a touch sensor 124 of the embodiment may be disposed in the active region 100a, so that a position of a touching object touching or approaching the in-cell touch display panel 100 in the active region 100a can be detected by the touch sensor 124. The touch sensor 124 is formed by a plurality of first touch electrode strips 126 and a plurality of second touch electrode strips 128 that intersect each other. The second touch electrode strips 128 extend along a first direction D1, and the first touch electrode strips 126 extend along a second direction D2 different from the first direction D1. The first touch electrode strips 126 intersect and are insulated from the second touch electrode strips 128, such that a mutual capacitor C is generated at an intersection of each of the first touch electrode strips 126 and each of the second touch electrode strips 128. In the embodiment, the touch sensor 124 may be driven by a mutual touch sensing method. For example, a touch driving signal may be transmitted to the first touch electrode strips 126, and the second touch electrode strips 128 may sense the touch driving signal through the mutual capacitors C to generate a touch sensing signal. When a touching object approaches or touches the in-cell touch display panel 100, the mutual capacitor C corresponding to the touching object is changed, and so the position of the touching object can be accordingly detected. In the present invention, the first touch electrode strips 126 and the second touch electrode strips 128 may be formed by the first transparent layer 106 and the first metal layer 109.

Further, the first touch electrode strips 126 and the second touch electrode strips 128 may be utilized to transmit the touch driving signal and the touch sensing signal in an individually sequential or grouped sequential manner. That is, the touch driving signal and the touch sensing signal may be transmitted by a unit of one single first touch electrode strip 126 or a group of first touch electrode strips 126. At this point, by coupling with the first touch electrode strips 126, one single second electrode strip 128 or one group of second electrode strips 128 may sense the change in the touch driving signal to further generate the touch sensing signal. In another embodiment, the touch driving signal may also be transmitted by the second touch electrode strips 128, and the touch sensing signal is correspondingly generated by the first touch electrode strips 126.

Figure 3:
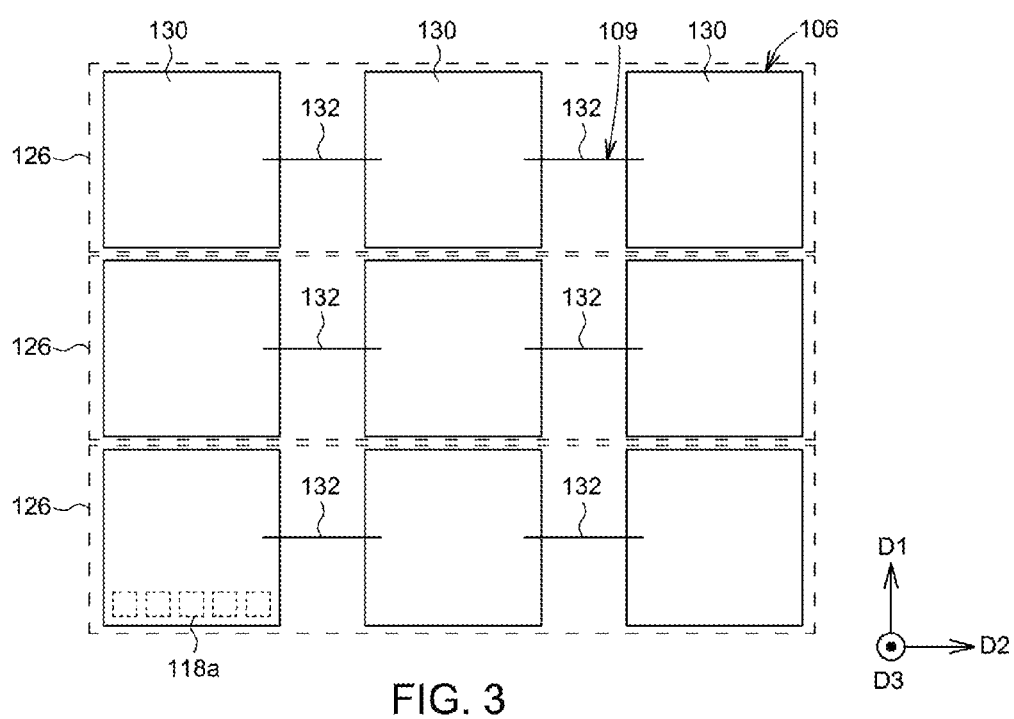
FIG. 3 is a top view of first touch electrode strips according to a first embodiment of the present invention.

Referring to FIG. 3, the first transparent layer 106 may include a plurality of first touch electrode portions 130, and the first metal layer 109 may include a plurality of second connecting lines 132. In the embodiment, the first touch electrode portions 130 are arranged in a matrix arrangement. The second connecting lines 132 extend along the second direction D2, and further extend to overlap with and electrically connect to any two adjacent first touch electrode portions 130 disposed along the second direction D2, such that the second connecting lines 132 and the first touch electrode portions 130 may form a plurality of first touch electrode strips 126 extending along the second direction D2. Further, each of the first touch electrode portions 130 is greater than the first openings 118*a*, and corresponds to one of the first openings 118*a*.

Figure 4:
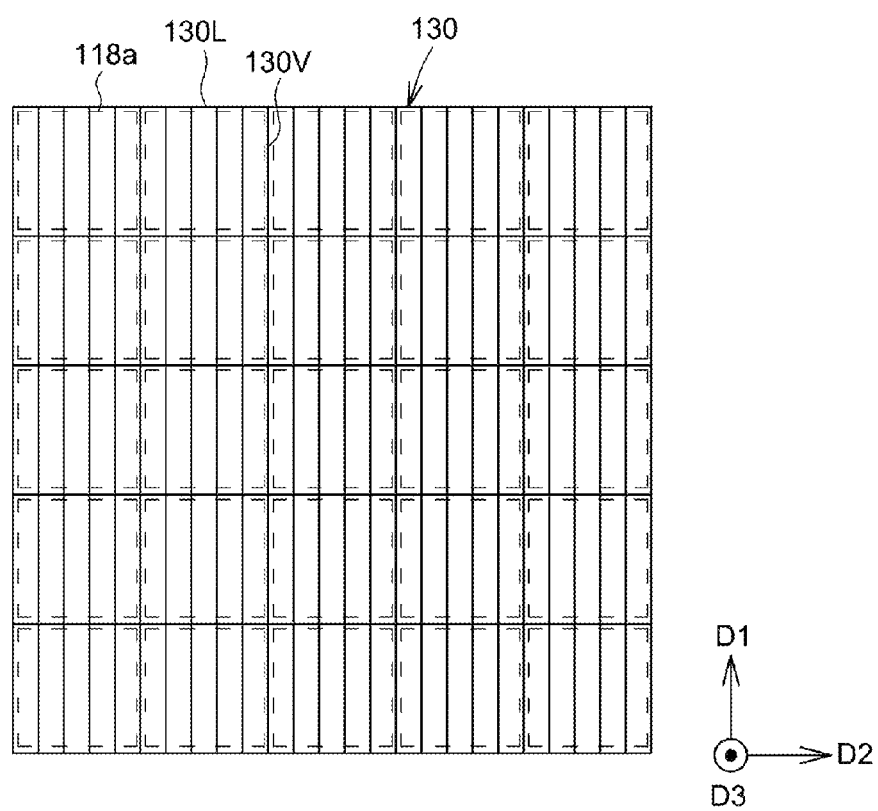
FIG. 4 is a top view of a first touch electrode portion according to a first embodiment of the present invention.

Referring to FIG. 4, for example, each of the first touch electrode portions 130 may include a plurality of first vertical transparent lines 130V extending along the first direction D1 and a plurality of horizontal transparent lines 130L extending along the second direction D2. The first vertical transparent lines 130V intersect and are connected to the first horizontal transparent lines 130L. A part of the first horizontal transparent lines 130L and a part of the first vertical transparent lines 130V are covered by the black matrix 118 in a third direction D3 perpendicular to the first substrate 102, and another part of the first horizontal transparent lines 130L and another part of the first vertical transparent lines 130V cross the first openings 118*a* of the black matrix 118 corresponding to the first touch electrode portions 130. A gap between any two adjacent first vertical transparent lines 130V may be smaller than a width of each of the first openings 118*a* in the second direction D2, and at least one the first vertical transparent lines 130V may cross the first openings 118*a*.

It should be noted that, in the embodiment, the first touch electrode strips 126 serve as not only as a part of the touch sensor 124 but also as common electrodes. More specifically, in the embodiment, the first touch electrode strips 126 may be utilized to transmit the touch driving signal in a touch control period, and to transmit a common voltage in a display period that is non-overlapping with the touch control period to serve as common electrodes.

In FIG. 3 and FIG. 4, each of the first touch electrode portions 130 in the second direction D2 includes the width of 5 first openings 118*a*. It should be noted that, the width ratio between the first touch electrode portions 130 and the first openings 118*a* is not limited to the above examples, and may be in other values. For example, each of the first touch electrode portions 130 in the second direction D2 may include the width of 30 first openings 118*a*, and such values can be correspondingly adjusted according to actual requirements. Similarly, the width of each of the first touch electrode portions 130 in the first direction D1 is not limited to the above example, and may be correspondingly adjusted according to actual requirements. For clearly illustrate associated characteristics, appropriate width ratios are adopted in the following drawings, and the associated details shall not be repeated in these drawings.

Figure 5:
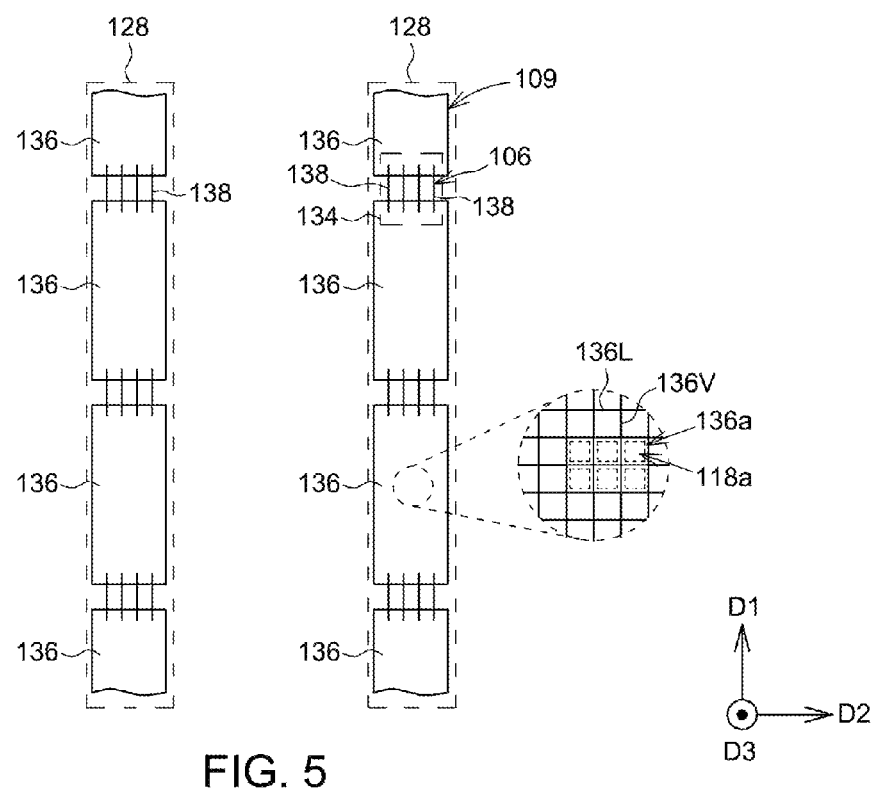
FIG. 5 is a top view second touch electrode strips according to the first embodiment of the present invention.

Referring to FIG. 5, the first transparent layer 106 may further include a plurality of connecting line groups 134, and the first metal layer 109 may further include a plurality second touch electrode portions 136. Each of the connecting line groups 134 extends along the first direction D1 to overlap with and electrically connect to any two adjacent second touch electrode portions 136 disposed along the first direction D1, such that the connecting line groups 134 and the second touch electrode portions 136 form a plurality of second touch electrode strips 128 extending along the first direction D1. Each of the connecting line groups 134 may include at least one first connecting line 138 extending along the first direction D1. In the embodiment, for example, each of the connecting line groups 134 includes a plurality of first connecting lines 138.

In the embodiment, the second touch electrode portions 136 may be in a lattice arrangement. More specifically, each of the second touch electrode portions 136 may include a plurality of vertical metal lines 136V extending along the first direction D1 and a plurality of horizontal metal lines 136L extending along the second direction D2. It should be noted that, in the third direction D3, the second touch electrode portions 136 do not overlap with the first openings 118*a* of the black matrix 118, i.e., the second touch electrode portions 136 do not overlap with the pixel regions that display the image. That is to say, in the third direction D3, the black matrix 118 shields the second touch electrode portions 136 of the first metal layer 109, leaving the aperture ratio of the pixels unaffected in the presence of the second touch electrode portions 136. Further, the vertical metal lines 136V intersect and are connected to the horizontal metal lines 136L to enclose and form a plurality of second openings 136*a*. The second openings 136*a* are greater than or equal to the first openings 118*a*. Thus, the gap between any two adjacent vertical metal lines 136V may be greater than or equal to the width of each of the first openings 118*a* in the second direction D2, and any two adjacent vertical metal lines 136V and any two adjacent horizontal metal lines 136L may enclose at least one pixel region.

In another embodiment, the second touch electrode portions may not be in a lattice arrangement, and may not include the horizontal lines extending along the second direction. That is to say, each of second touch electrode strips may include only a plurality of vertical metal lines extending along the first direction, and any two adjacent vertical metal lines disposed along the first direction may be electrically connected via the first connecting lines. The first metal layer may further include a plurality connecting strips, which are disposed in the border region and extend along a direction different from the first direction, e.g., along the second direction. Alternatively, the connecting strips may be formed by a conductive layer other than the first metal layer.

Figure 6:
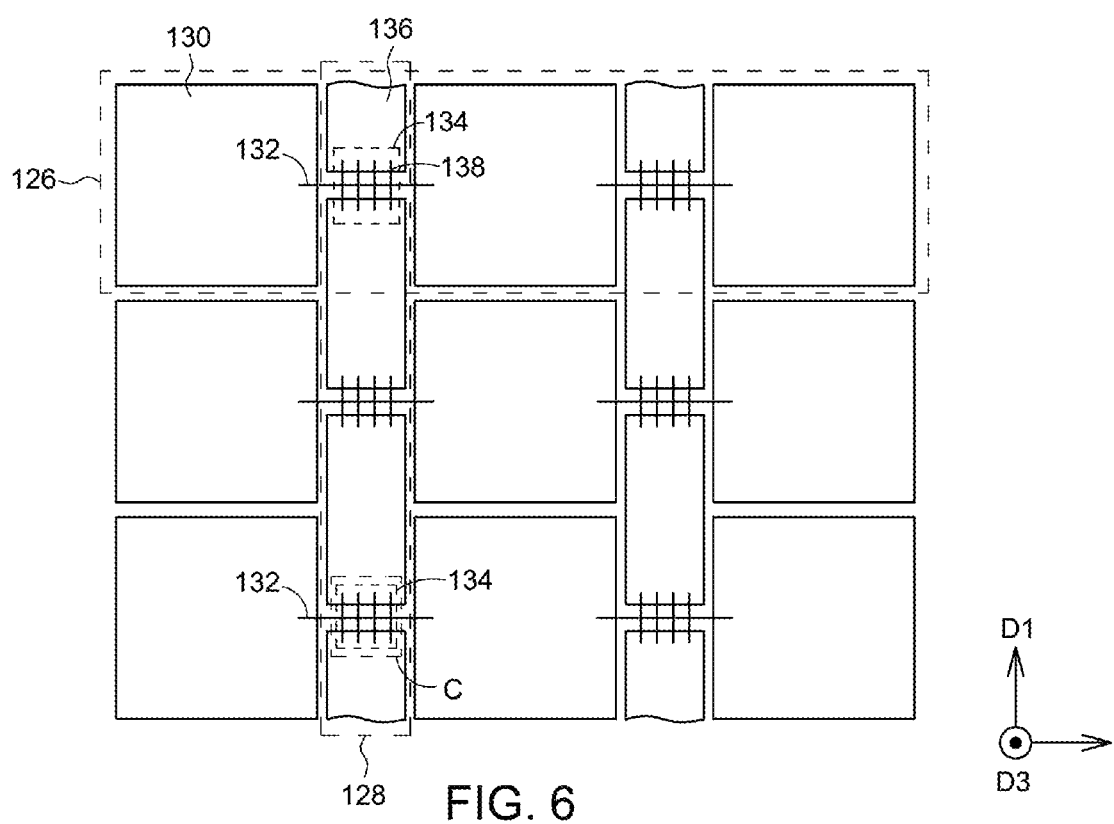
FIG. 6 is a top view of a touch sensor according to the first embodiment of the present invention.

Corresponding relationships between first touch electrode strips 126 and the second touch electrode strips 128 of the embodiment are further described below. Referring to FIG. 6, the second touch electrode strips 128 extending along the first direction D1 are disposed between any two adjacent columns of the first touch electrode portions 130, and the first touch electrode portions 130 of the same row and adjacent columns are connected along the second direction D2 to form the first touch electrode strip 126. As such, the second touch electrode strips 128 cross to intersect and are insulated from the first touch electrode strips 126. More specifically, as the first touch electrode portions 130 and the connecting line groups 134 are formed by the same first transparent layer 106, in order to insulate the first touch electrode portions 130 from the connecting line groups 134, the first touch electrode portions 130 are not connected to the connecting line groups 134, the first touch electrode portions 130 of the adjacent columns are connected to each other via the second connecting lines 132 disposed at the first metal layer 109, and each of the connecting line groups 134 of the second touch electrode strips 128 is disposed between any two adjacent first touch electrode portions 130 disposed along the second direction D2. Further, in the first metal layer 109, in order to insulate the second touch electrode portions 136 from the second connecting lines 132, the second touch electrode portions 136 are not connected to the second connecting lines 132, the second touch electrode portions 136 of the same column and adjacent rows are connected to each other via the connecting line group 134 disposed at the first transparent layer 106, and each of the second connecting lines 132 is disposed between any two adjacent second touch electrode portions 136 disposed along the first direction D1. Accordingly, the second connecting lines 132 may cross the connecting line groups 134 of the second touch electrode strips 128, and the mutual capacitors C may form at intersections of the second connecting lines 132 and the connecting line groups 134.

Figure 7:
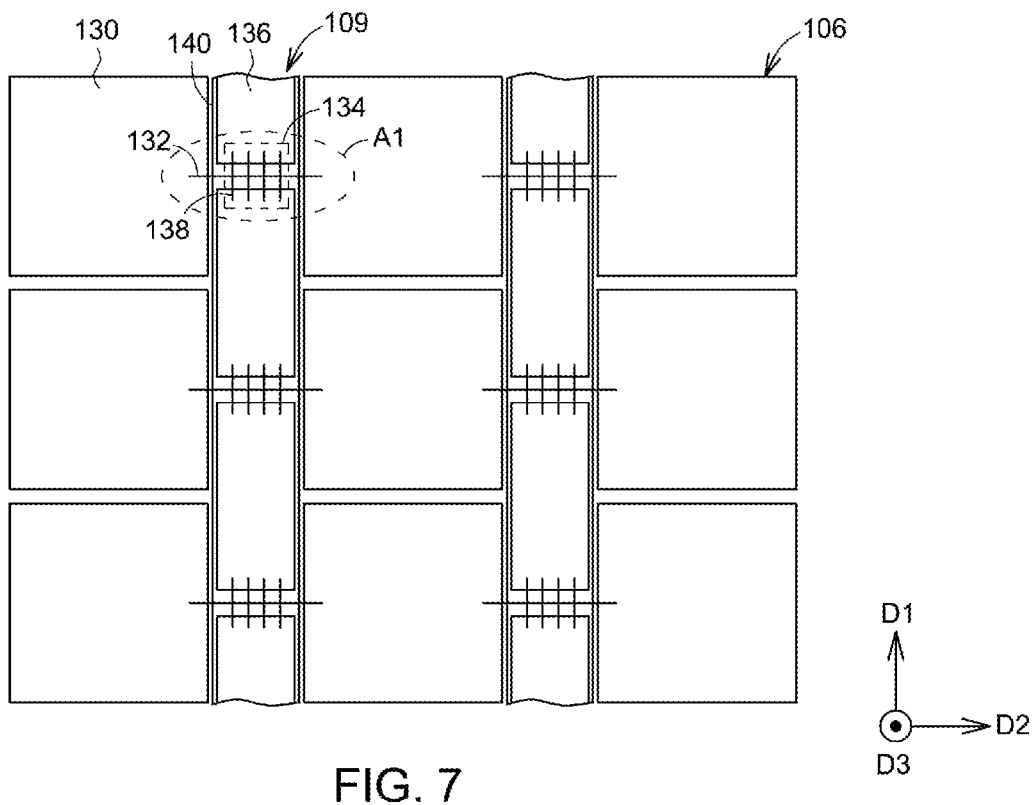
FIG. 7 is a top view of a first transparent layer and a first metal layer according to the first embodiment of the present invention.

Referring to FIG. 7, the first transparent layer 106 may further include a plurality of display electrode strips 140 extending along the first direction D1. The display electrode strips 140 serve as a common electrode, and may be electrically connected to a same common voltage in the display period. Thus, in the display period, the display electrode strips 140 are not kept floating to prevent the in-cell touch display panel 100 from displaying unsatisfactory images. To electrically insulate the display electrode strips 140 from the first touch electrode strips 126 and the second touch electrode strips 128, the display electrode strips 140 are not in contact with the first touch electrode portions 130 and the connecting line groups 134 disposed at the first transparent layer 106. Further, the display electrode strips 140 overlap with the second touch electrode portions 136 of the second touch electrode strips 128, and are thus disposed between any two adjacent columns of the first touch electrode portions 130, and intersect the second connecting lines 132 arranged in the first direction D1.

Figure 9:
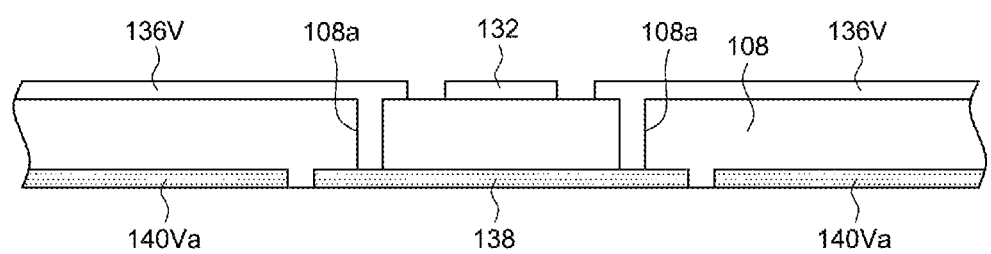
FIG. 9 is a section view along a section line A-A' in FIG. 8.
Figure 10:
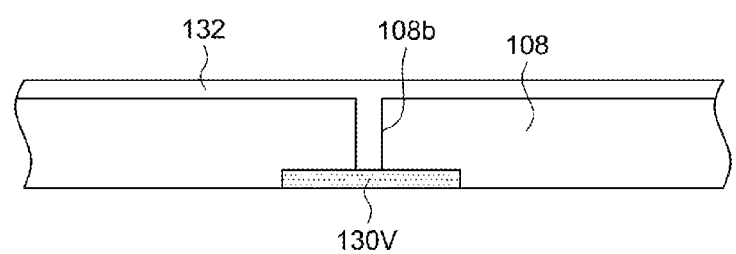
FIG. 10 is a section view along a section line B-B' in FIG. 8.

Configuration relationships of the first touch electrode strips 126 and the second touch electrode strips 128 are given in detail with reference to FIG. 8 to FIG. 10 below. The first touch electrode portions 130 disposed at the first transparent layer 106 and the second connecting lines 132 disposed at the first metal layer 109 form the first touch electrode strips 126, and the second touch electrode portions 136 disposed at the first metal layer 109 and the first connecting lines 138 disposed at the first transparent layer 106 form the second touch electrode strips 128. More specifically, the first insulation layer 108 may further include a plurality of first through holes 108a disposed between the vertical metal lines 136V of the second touch electrode portions 136 and the corresponding first connecting lines 138, so as to allow each of the second touch electrode portions 136 to electrically connect to one end of at least one of the first connecting lines 138 of the connecting line groups 134 via the first through holes 108a. Further, the first insulation layer 108 may include a plurality of second through holes 108b disposed between one of the first vertical transparent lines 130V of the first touch electrode portions 130 and the corresponding second connecting line 132, so as to allow each of the first touch electrode portions 130 to electrically connect to the second connecting lines 132 via the second through holes 108b. In another embodiment, the second through holes 108b may be disposed between one of the first horizontal transparent lines 130L of the first touch electrode portions 130 and the corresponding second connecting line 132.

Each of the display electrode strips 140 may further include a plurality of second vertical transparent lines 140V and a plurality of second horizontal transparent lines 140L. The second vertical transparent lines 140V extend along the first direction D1, and intersect and are connected to the second horizontal transparent lines 140L extending along the second direction D2. A gap of any two adjacent vertical transparent lines 140V may be smaller than width of each of the first openings 118a in the second direction D2, and at least one of the second vertical transparent lines 140V may cross the first openings 118a. In the embodiment, the second vertical transparent lines 140V may be divided into a plurality of first sub-transparent lines 140Va and a plurality of second sub-transparent lines 140Vb. The first sub-transparent lines 140Va overlap with the vertical metal lines 136V, and do not cross the second connecting lines 132. The first connecting lines 138 that intersect the second connecting lines 132 may be disposed between any two adjacent first sub-transparent lines 140Va disposed along the first direction D1, and are not in contact with the first sub-transparent lines 140Va. Further, the first sub-transparent lines 140Va and the second horizontal transparent lines 140L may be covered by the black matrix 118 in the third direction D3. Further, the second sub-transparent lines 140Vb may cross the first openings 118a of the black matrix 118 corresponding to the second touch electrode strips 128 and may cross the second connecting lines 132 disposed along the first direction D1, and at least one of the second sub-transparent lines 140Vb is disposed between any two adjacent first connecting lines 138 disposed along the second direction D2. In the embodiment, the second sub-transparent lines 140Vb do not overlap with the vertical metal lines 136V. In another embodiment, a part of the second sub-transparent lines 140Vb may be covered by the black matrix 118 in the third direction D3, and overlap with a part of the vertical metal lines 136V.

In the embodiment, the first metal layer 109 may further include a plurality of third connecting lines 142, which extend along the second direction D2 and are insulated from the second touch electrode portions 136 of the first metal layer 109. At least one of the third connecting lines 142 overlaps with and is electrically connected to the first touch electrode portions 130 in the third direction D3. More specifically, the first insulation layer 108 may include a plurality of third through holes 108c, and at least two parts of each of the third connecting lines 142 may electrically connect to one first touch electrode portion 130 via at least two of the third through holes 108c. As the third connecting lines 142 are formed by metal, the resistance value of the third connecting lines 142 is smaller than that of the first touch electrode portions 130 formed by a transparent conductive material. Thus, by electrically connecting the third connecting lines 142 to the first touch electrode portions 130, the resistance value of the first touch electrode portions 130 may be effectively reduced. In the embodiment, for example, the third connecting lines 142 extend along the second direction. In another embodiment, the third connecting lines 142 may extend along the first direction D1.

Figure 8:
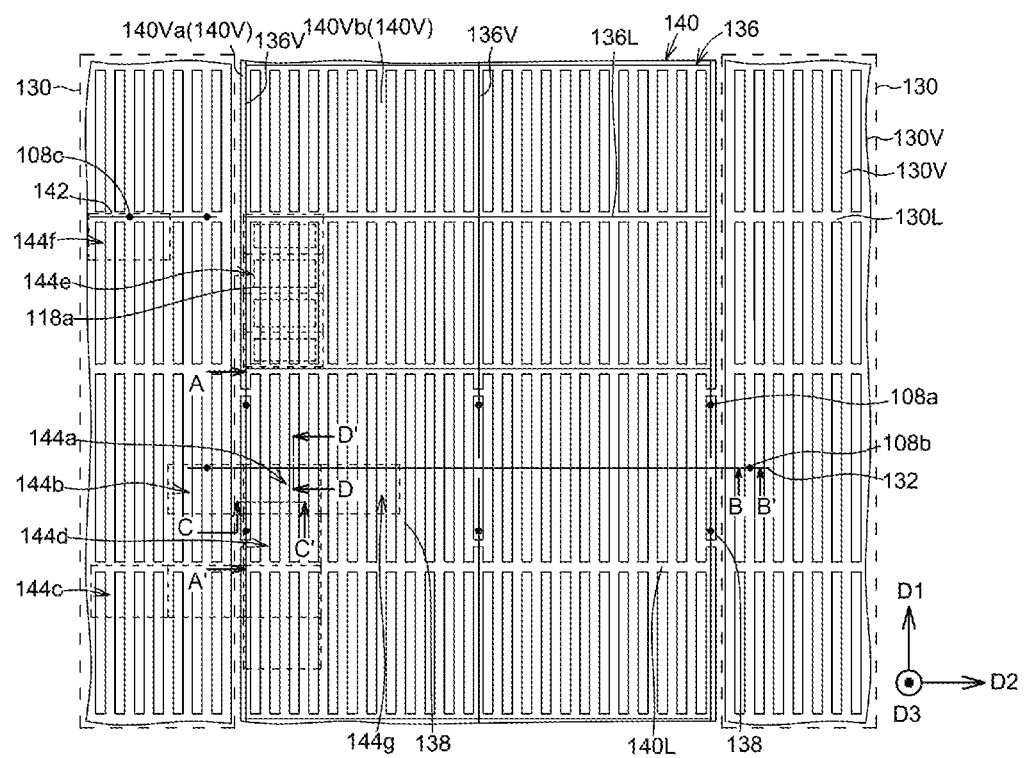
FIG. 8 is an enlarge view of an area A1 in FIG. 7.
Figure 11:
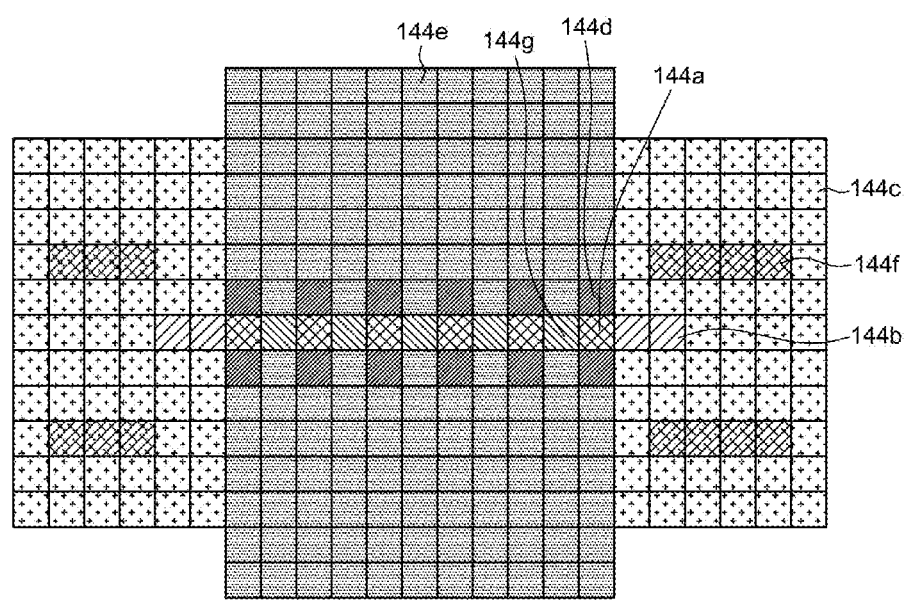
FIG. 11 is a top view of display pixel units according to the first embodiment of the present invention.

Referring to FIG. 11 as well as FIG. 8, in the embodiment, the in-cell touch display panel 100 may include a plurality of display pixel units 144. For example, the display pixel units 144 correspond to pixel structures that the in-cell touch display panel 100 utilizes for displaying an image. The display pixel units 144 may include a plurality of first display pixel units 144a, a plurality of second display pixel units 144b, a plurality of third display pixel units 144c, a plurality of fourth display pixel units 144d and a plurality of fifth display pixel units 144e. The display pixel units located in different regions have different structures, with associated details to be described below.

Figure 12:
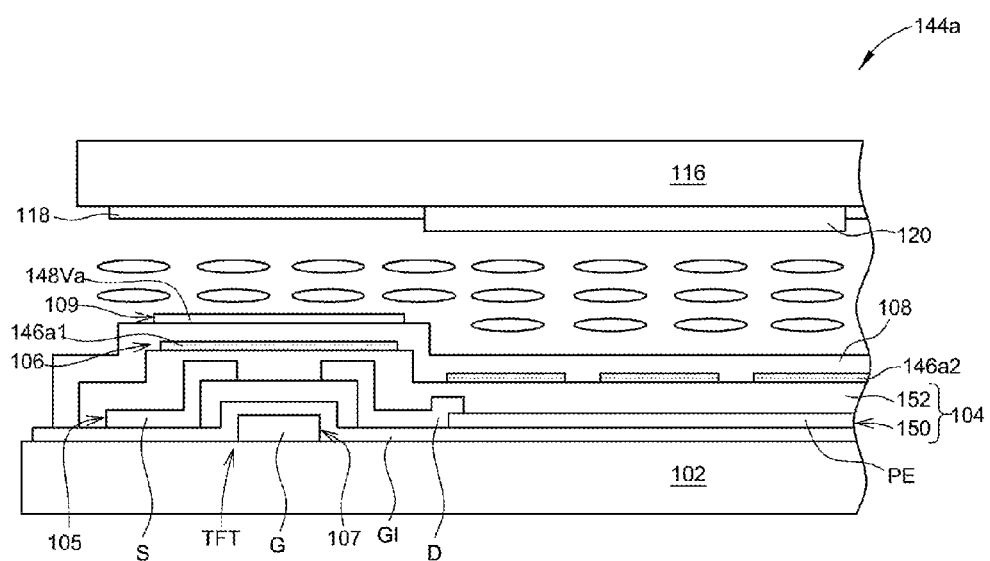
FIG. 12 is a section view of the first display pixel unit along a section line C-C' in FIG. 8.
Figure 13:
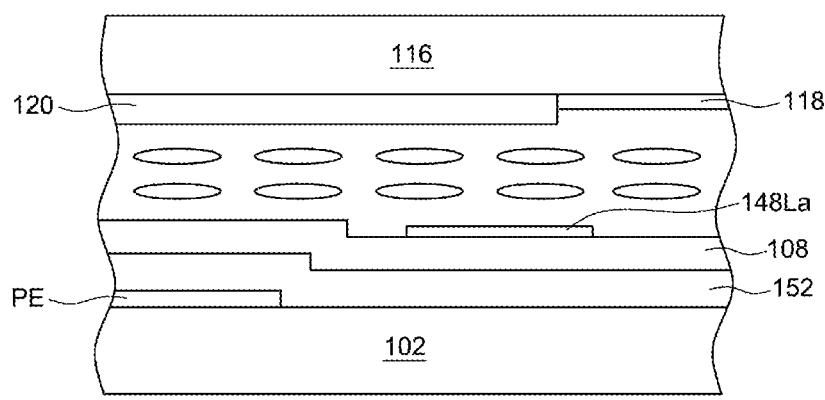
FIG. 13 is a section view of the first display pixel unit along a section line D-D' in FIG. 8.

Referring to FIG. 12 and FIG. 13 as well as FIG. 8 and FIG. 11, the first display pixel units 144a correspond to regions where the first connecting lines 138 cross the second connecting lines 132, and may include the first transparent layer 106 and the first metal layer 109. FIG. 12 shows a section view of a first display pixel unit along a section line C-C' in FIG. 8. FIG. 13 shows a section view of a first display pixel unit along a section line D-D' in FIG. 8. More specifically, in each of the first display pixel units 144a, the first transparent layer 106 includes a first transparent segment 146a1 extending along the first direction D1, and the first metal layer 109 includes a first metal segment 148La extending along the second direction D2 and a sixth metal segment 148Va extending along the first direction D1. The sixth metal segment 148Va of each of the first display pixel units 144a is electrically connected to the first transparent segment 146a1, and the first metal segment 148La crosses the first transparent segment 146a1 and is insulated from the first transparent segment 146a1.

Further, the first transparent layer 106 of each of the first display pixel units 144a may further include a plurality of sixth transparent segments 146a2 extending along the first direction D1. The sixth transparent segments 146a2 are insulated from the first transparent segments 1461a, the first metal segments 148La and the sixth metal segments 148Va.

In addition to the first transparent layer 106 and the first metal layer 109, each of the first display pixel units 144a may further include the semiconductor stack 104. The semiconductor stack 104 of each of the first display pixel units 144a may include a pixel control element, which may include a thin-film transistor (TFT), a gate (not shown), a data line (not shown), a second transparent layer 150 and a second insulation layer 152. The TFT is disposed adjacently to an intersection of the gate line and the data line, and includes a gate G, a gate insulation layer GI, a source S and a drain D. The gate G is connected to the gate line. In the embodiment, the gate G and the gate line may be formed by the second metal layer 107. The gate insulation layer GI covers the second metal layer 107 and the first substrate 102. The source S is electrically connected to the data line. For example, the source S, the drain D and the data line may be formed by the third metal layer 105. The type of TFT of the present invention is not limited to the above example, and may be other types, e.g., a top low-temperature polysilicon gate (LTPS) TFT. In the embodiment, the second transparent layer 150 of each of the first display pixel units 144a includes a pixel electrode PE electrically connected to the drain D of the TFT. The second insulation layer 152 covers the third metal layer 105, the pixel electrode PE and the gate insulation layer GI. Thus, the pixel electrode PE may be insulated from the first sixth transparent segment 146a2 of the first transparent layer 106 via the second insulation layer 152. When the in-cell touch display panel 100 performs a display function, a voltage between the pixel electrode PE and the sixth transparent segment 146a2 located thereon may form an in-phase electric field. It should be noted that, the semiconductor stack 104 of the present invention is not limited to the above structure, and may be correspondingly adjusted according to actual requirements. For example, the pixel electrode may further include a slit disposed correspondingly to the second transparent segment.

Figure 14:
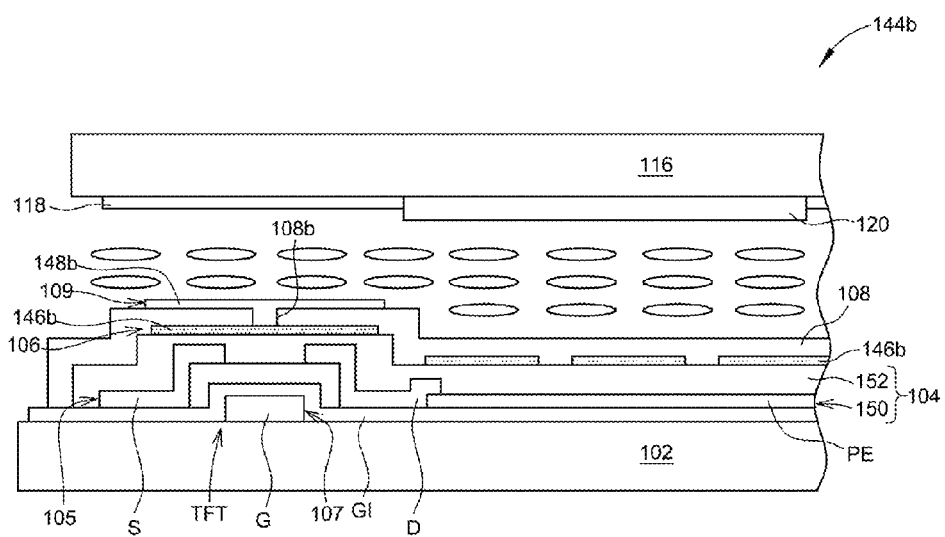
FIG. 14 is a section view of a second display pixel unit according to the first embodiment of the present invention.

Referring to FIG. 14 as well as FIG. 8 and FIG. 11, the second display pixel units 144b correspond to regions where the second connecting lines 132 overlap with the first touch electrode portions 130. Each of the second display pixel units 144b may include the first metal layer 109 and the first transparent layer 106. More specifically, in each of the second display pixel units 144b, the first metal layer 109 includes a second metal segment 148b, and the second metal segment 148b and the first metal segment 148La corresponding to the same second connecting line 132 are electrically connected to each other. The first transparent layer 106 includes a plurality of second transparent segments 146b, and the second metal segments 148b corresponding to the same first touch electrode strip 126 may electrically connect to one of the second transparent segments 146b via the second through holes 108b.

Figure 15:
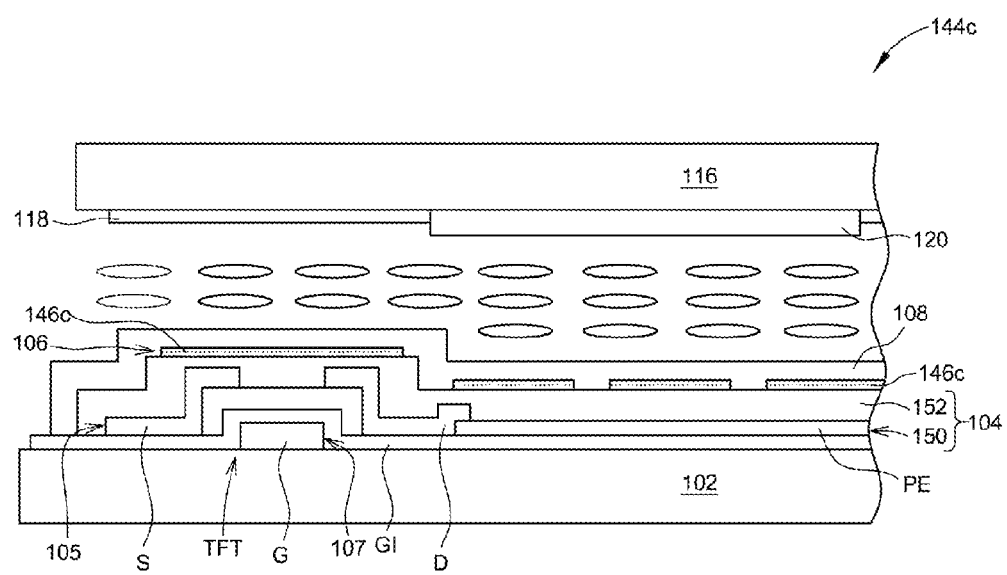
FIG. 15 is a section view of a third display pixel unit according to the first embodiment of the present invention.

Referring to FIG. 15 as well as FIG. 8 and FIG. 11, the third display pixel units 144c correspond to regions of the first touch electrode portion 130 that does not overlap with the second connecting lines 132. Compared to the second display pixel units 144b, each of the third display pixel units 144c does not include the first metal layer 109, and includes the first transparent layer 106. More specifically, in each of the third display pixel units 144c, the first transparent layer 106 may include a plurality of third transparent segments 146c. As previously described, the second metal segment 148b and the first metal segment 148La corresponding to the same second connecting line 132 are electrically connected to each other to form the second connecting line 132. Further, the second transparent segment 146b of the second display pixel unit 144b and the second metal segment 148b corresponding to the same first touch electrode strip 126 may be electrically connected via the second through holes 108b. Thus, the first metal segment 148La, the second metal segment 148b, the second transparent segment 146b and the third transparent segment 146c corresponding to the same first touch electrode strip 126 may form the first touch electrode strip 126.

Figure 16:
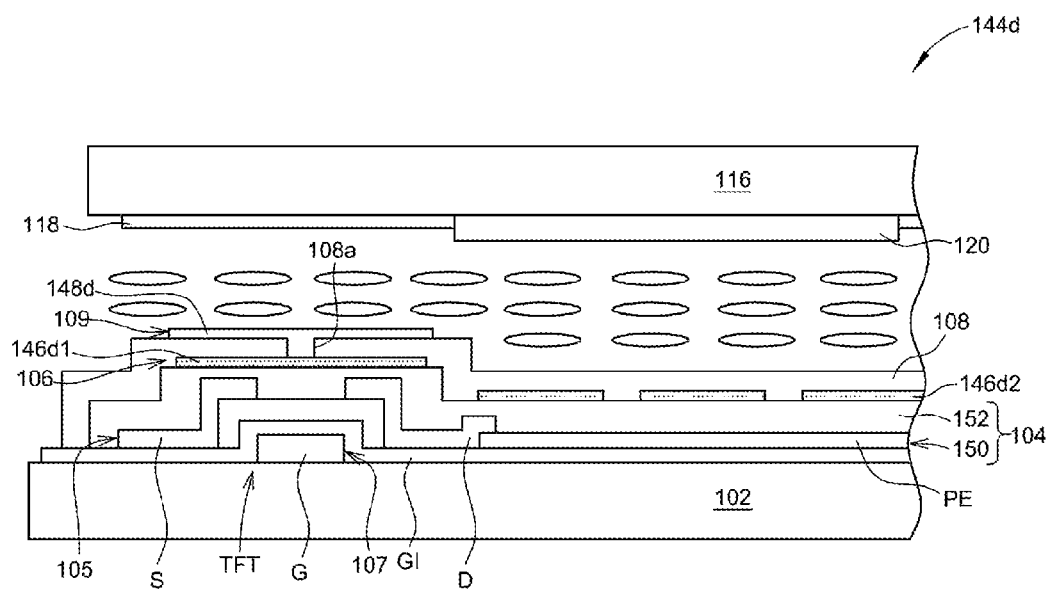
FIG. 16 is a section view of a fourth display pixel unit according to the first embodiment of the present invention.

Referring to FIG. 16 as well as FIG. 8 and FIG. 11, the fourth display pixel units 144d correspond to regions where the first connecting lines 138 overlap with the second touch electrode portions 136. Each of the fourth display pixel units 144d is disposed adjacently to one of the first display pixel units 144a, and may include the first transparent layer 106 and the first metal layer 109. More specifically, in each of the fourth display pixel units 144d, the first transparent layer 106 may include a fourth transparent segment 146d1, and the first transparent segment 146a1 and the fourth transparent segment 146d1 corresponding to the same first connecting line 138 are electrically connected to each other. Thus, the fourth transparent segments 146d1 and the first transparent segments 146a1 form a plurality of first connecting lines 138, i.e., the fourth transparent segments 146d1 and the first transparent segments 146a1 form a plurality of connecting line groups 134. Further, the metal layer 109 of each of the fourth display pixel units 144d includes a third metal segment 148d. The third metal segments 148d corresponding to the same second touch electrode strip 128 may electrically connect to the fourth transparent segments 146d1 via the first through holes 108a.

The first transparent layer 106 of each of the fourth display pixel units 144d may further include a plurality of seventh transparent segments 146d2, which are insulated from the fourth transparent segments 146d1.

Figure 17:
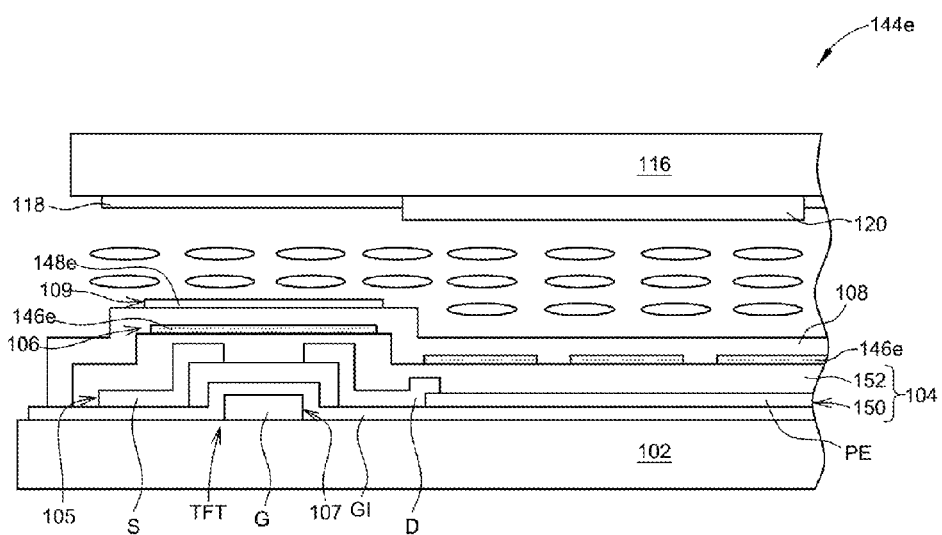
FIG. 17 is a section view of a fifth display pixel unit according to the first embodiment of the present invention.

Referring to FIG. 17 as well as FIG. 8 and FIG. 11, the fifth display pixel units 144e correspond to regions where the first connecting lines 138 do not overlap with the second touch electrode portions 136. Each of the fifth display pixel units 144e includes the first metal layer 109 and the first transparent layer 106. More specifically, the first metal layer 109 of each of the fifth display pixel units 144e includes a fourth metal segment 148e, and the fourth metal segment 148e and the third metal segment 148d corresponding to the same second touch electrode portion 136 are electrically connected to each other to form the second touch electrode portion 136. Thus, the third metal segments 148*d* of the fourth display pixel units 144*d* and the fourth metal segments 148*e* of the fifth display pixel units 144*e* form a plurality of second touch electrode portions 136. As previously described, the first transparent segment 146*a*1 and the fourth transparent segment 146*d*1 corresponding to the same first connecting line 138 are electrically connected to each other to form the first connecting line 138. Further, the third metal segment 148*d* and the fourth transparent segment 146*d*1 corresponding to the same corresponding second touch electrode strip 128 are electrically connected via the first through hole 108*a*. Therefore, the first transparent segment 146*a*1, the sixth metal segment 148Va, the fourth transparent segment 146*d*1, the third metal segment 148*d* and the fourth metal segment 148*e* corresponding to the same second touch electrode strip 128 may form the second touch electrode strip 128.

Further, the first transparent layer 106 of each of the fifth display pixel units 1443 includes a plurality of eighth transparent segments 146*e*, and the sixth transparent segment 146*e*, the seventh transparent segment 146*d*2 and the eighth transparent segment 146*e* corresponding to the same display electrode strip 140 are electrically connected to one another.

Figure 18:
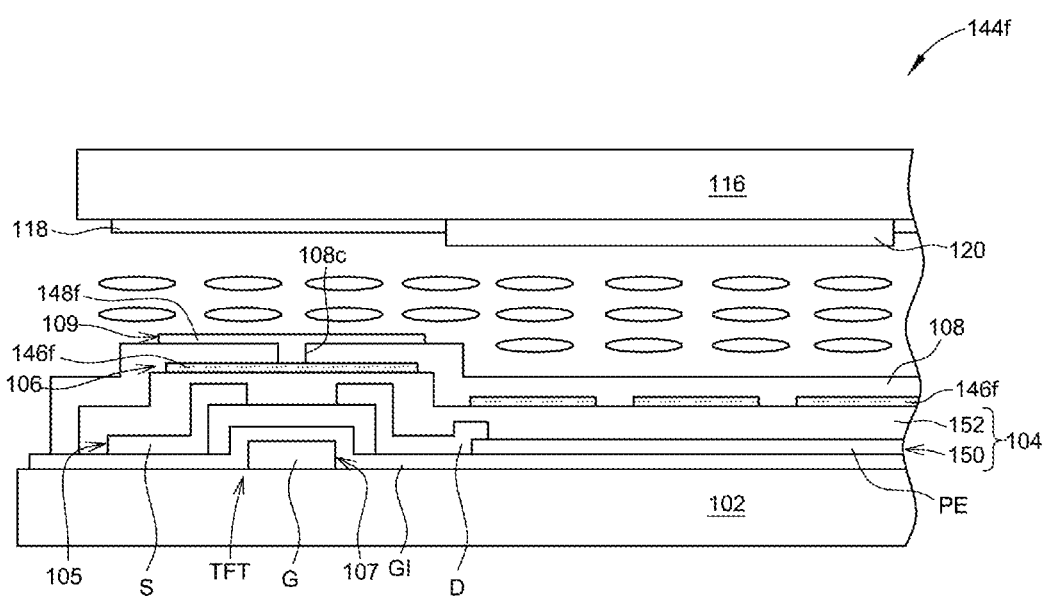
FIG. 18 is a section view of a sixth display pixel unit according to the first embodiment of the present invention.

Referring to FIG. 18 as well as FIG. 8 and FIG. 11, the display pixel units 144 may further include a plurality of sixth display pixel units 144*f*. The sixth display pixel units 144*f* correspond to regions where the third connecting lines 142 overlap with the first touch electrode portions 130. Each of the sixth display pixel units 144 includes the first metal layer 109 and the first transparent layer 106. More specifically, the first metal layer 109 of each of the sixth display pixel units 144*f* includes a fifth metal segment 148*f*, and the fifth metal segments 148*f* of the plurality of sixth display pixel units 144*f* corresponding to the same third connecting line 142 are electrically connected to one another to form the third connecting line 142.

Further, the first transparent layer 106 of each of the sixth display pixel units 144*f* includes a plurality of fifth transparent segments 146*f*. The fifth transparent segments 146*f* of the sixth display pixel units 144*f*, the third transparent segment 146*c* of the third display unit 144*c* and the second transparent segment 146*b* of the second display pixel unit 144*b* corresponding to the same first touch electrode portion 130 are electrically connected. The first insulation layer 108 of each of the sixth display pixel units 144*f* includes the third through holes 108*c*, such that the fifth metal segment 148*f* may be electrically connected to the fifth transparent segment 146*f* via the third through hole 108*c*. Thus, the second transparent segments 146*b* of the second display pixel units 144*b*, the third transparent segments 146*c* of the third display pixel units 144*c*, and the fifth transparent segments 146*f* of the sixth display pixel units 144*f* may form a plurality of first touch electrode portions 130.

Figure 19:
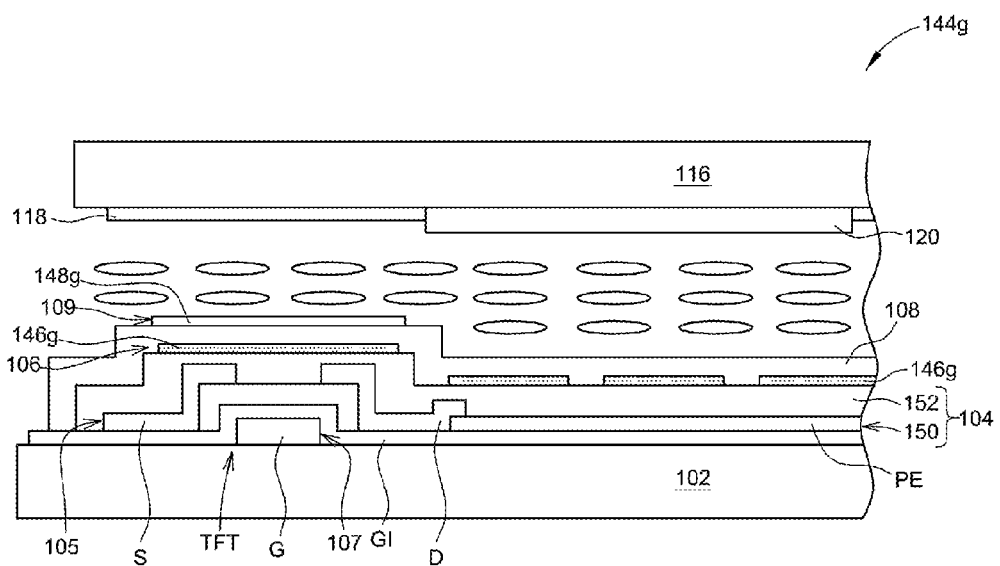
FIG. 19 is a section view of a seventh display pixel unit according to the first embodiment of the present invention.

Referring to FIG. 19 as well as FIG. 8 and FIG. 11, the display pixel units 144 may further include a plurality of seventh display pixel units 144*g*. The seventh display pixel units 144*g* correspond to regions where the second connecting lines 132 do not overlap with the first connecting lines 138. Each of the seventh display pixel units 144*g* includes the first metal layer 109 and the first transparent layer 106. In the embodiment, the first metal layer 109 of each of the seventh display pixel units 144*g* includes a seventh metal segment 148*g*, and the seventh metal segment 148*g*, the first metal segment 148La and the second metal segment 148*b* corresponding to the same second connecting line 132 are electrically connected to form the second connecting line 132. Therefore, the first metal segments 148La of the first display pixel units 144*a*, the second metal segments 148*b* of the second display pixel units 144*b*, and the seventh metal segments 148*g* of the seventh display pixel units 144*g* may form a plurality of second connecting lines 132.

Further, the first transparent layer 106 of each of the seventh display pixel units 144*g* includes a plurality of ninth transparent segments 146*g*, and the sixth transparent segment 146*a*2, the sixth metal segment 148Va, the seventh transparent segment 146*d*2, the eighth transparent segment 146*e* and the ninth transparent segment 146*g* corresponding to the same display electrode strip 140 are electrically connected to one another to form the display electrode strip 140. Therefore, the sixth transparent segments 146*a*2 and the sixth metal segments 148*a*2 of the first display pixel units 144*a*, the seventh transparent segment 146*d*2 of the fourth display pixel units 144*d*, the eighth transparent segments 146*e* of the fifth display pixel units 144*e*, and the ninth transparent segments 146*g* of the seventh display pixel units 144*g* may form a plurality of display electrode strips 140.

The second display pixel units 144*b*, the third display pixel units 144*c*, the fourth display pixel units 144*d*, the fifth display pixel units 144*e*, the sixth display pixel units 144*f* and the seventh display pixel units 144*g* all include the semiconductor stack 104, which is structurally identical to the semiconductor stack 104 of the first display pixel units 144*a*. Such repeated details shall be omitted herein.

Figure 20:
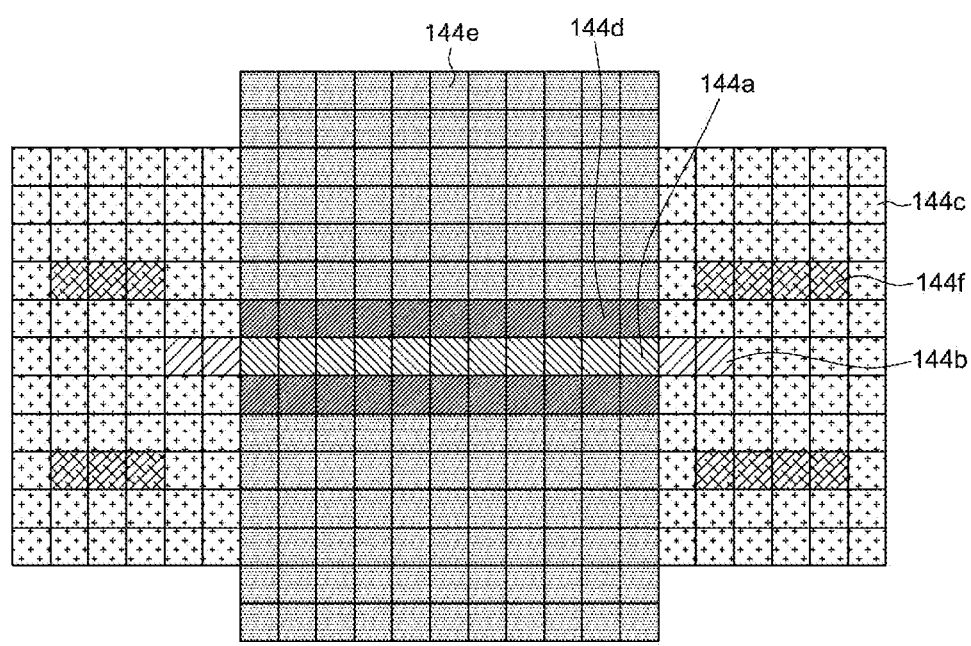
FIG. 20 is a top view of display pixel units according to another embodiment of the present invention.

In another embodiment, the number of the first connecting lines 138 may be equal to the number of the vertical metal lines 136V, and so the display pixel units 144 may not include the seventh display pixel units 144*g*, as shown in FIG. 20. The second transparent segments 146*b* of the second display pixel units 144*b*, the third transparent segments 146*c* of the third display pixel units 144*c*, and the fifth transparent segments 146*f* of the fifth display pixel units 144*f* may form the first touch electrode portions 130; the first metal segments 148La of the first display pixel units 144*a* and the second metal segments 148*b* of the second display pixel units 144*b* may form the second connecting lines 132; and the first touch electrode portions 130 and the second connecting lines 132 may form a plurality of first touch electrode strips 126. That is to say, the second transparent segments 146*b* of the second display pixel units 144*b*, the third transparent segments 146*c* of the third display pixel units 144*c*, the fifth transparent segments 146*f* of the sixth display pixel units 144*f*, the first metal segments 148La of the first display pixel units 144*a*, and the second metal segments 148*b* of the second display pixel units 144*b* may form the first touch electrode strips 126.

The fourth metal segments 148*e* of the fifth display pixel units 144*e* and the third metal segments 148*d* of the fourth display pixel units 144*d* may form the second touch electrode portions 136; the first transparent segment 146*a*1 of the first display pixel units 144*a* and the fourth transparent 146*d*1 of the fourth display pixel units 144*d* may form the first connecting lines 138; and the second touch electrode portions 136 and the first connecting lines 138 may form a plurality of second touch electrode strips 128. That is to say, the fourth metal segments 148*e* of the fifth display pixel units 144*e*, the third metal segments 148*d* of the fourth display pixel units 144*d*, the first transparent segments 146*a*1 of the first display pixel units 144*a*, and the fourth transparent segments 146*d*1 of the fourth display pixel units 144*d* may form the second touch electrode strips 128.

The sixth transparent segments 146a2 of the first display pixel units 144a, the seventh transparent segments 146d2 of the fourth display pixel units 144d, and the eighth transparent segments 146e of the fifth display pixel units 144e form a plurality of display electrode strips 140.

Figure 21:
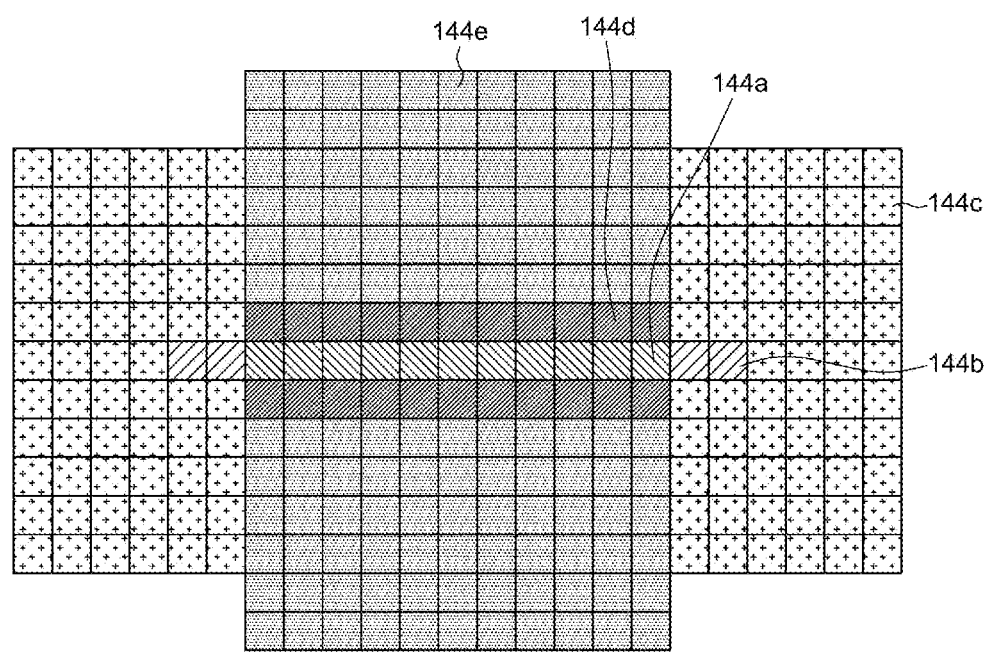
FIG. 21 is a top view of display pixel units according to another embodiment of the present invention.

In an alternative embodiment, the first metal layer 109 may not include the third connecting lines 142, and so the display pixel units 144 may not include the sixth display pixel units 144f, either, as shown in FIG. 21. The third transparent segments 146c corresponding to the same first touch electrode portion 130 may be electrically connected to the second transparent segment 146b to form the first touch electrode portion 130. Therefore, the third transparent segments 146c of the third display pixel units 144c and the second transparent segments 146b of the second display pixel units 144b may form a plurality of first touch electrode portions 130.

In conclusion, in the present invention, the touch sensor may be disposed in the display panel, and the first touch electrode strips and the second touch electrode strips of the touch sensor may be formed via the first transparent layer and the first metal layer, thus eliminating an additional touch panel that directly adheres with the display panel. Therefore, costs as well as the thickness and weight of the in-cell touch display panel can be at the same time reduced.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An in-cell touch display panel having a transparent layer and a metal layer, comprising:
   a plurality of first display pixel units, each comprising a first transparent segment disposed in the transparent layer and a first metal segment disposed in the metal layer;
   a plurality of second display pixel units, each comprising a second transparent segment disposed in the transparent layer and a second metal segment disposed in the metal layer, the second transparent segments being electrically connected to the second metal segments;
   a plurality of third display pixel units, each comprising a third transparent segment disposed in the transparent layer;
   a plurality of fourth display pixel units, each comprising a fourth transparent segment disposed in the transparent layer and a third metal segment disposed in the metal layer, the fourth transparent segments being electrically connected to the third metal segments; and
   a plurality of fifth display pixel units, each comprising a fourth metal segment disposed in the metal layer;
   wherein, the second transparent segments, the third transparent segments, the first metal segments and the second metal segments form a plurality of first touch electrode strips extending along a second direction; the first transparent segments, the fourth transparent segments, the third metal segments and the fourth metal segments form a plurality of second touch electrode strips extending along a first direction; the first touch electrode strips are insulated from the second touch electrode strips.

2. The in-cell touch display panel according to claim 1, wherein the first transparent segments of the first display pixel units and the fourth transparent segments of the fourth display pixel units form a plurality of first connecting lines.

3. The in-cell touch display panel according to claim 2, wherein the first metal segments of the first display pixel units and the second metal segments of the second display pixel units form a plurality of second connecting lines, and the second connecting lines cross the first connecting lines.

4. The in-cell touch display panel according to claim 3, wherein each of the first touch electrode strips comprises a plurality of first touch electrode portions and a plurality of the second connecting lines, the second transparent segments of the second display pixel units and the third transparent segments of the third display pixel units form the first touch electrode portions, and one of the second connecting lines connects two of the first touch electrode portions.

5. The in-cell touch display panel according to claim 3, wherein each of the second touch electrode strips comprises a plurality of second touch electrode portions and a plurality of the first connecting lines, the third metal segments of the fourth display pixel units and the fourth metal segments of the fifth display pixel units form the second touch electrode portions, and one of the first connecting lines connects two of the second touch electrode portions.

6. The in-cell touch display panel according to claim 3, further comprising:
   a plurality of sixth display pixel units, each comprising a fifth transparent segment disposed in the transparent layer and a fifth metal segment disposed in the metal layer;
   wherein, each of the first touch electrode strips comprises a plurality of first touch electrode portions and a plurality of the second connecting lines, the second transparent segments of the second display pixel units, the third transparent segments of the third display pixel units, and the fifth transparent segments of the sixth display pixel units form the first touch electrode portions, and one of the second connecting lines connects two of the first touch electrode portions.

7. The in-cell touch display panel according to claim 6, wherein the fifth metal segments of the sixth display pixel units form a plurality of third connecting lines, and each of the third connecting lines is electrically connected to one of the first touch electrode portions.

8. The in-cell touch display panel according to claim 1, wherein each of the first display pixel units further comprises a sixth transparent segment disposed in the transparent layer and a sixth metal segment disposed in the metal layer, each of the fourth display pixel units further comprises a seventh transparent segment disposed in the transparent layer, and each of the fifth display pixel units further comprises an eighth transparent segment disposed in the transparent layer; the sixth transparent segments of the first display pixel units, the seventh transparent segments of the fourth display pixel units, and the eighth transparent segments of the fifth display pixel units form a plurality of display electrode strips extending along the first direction; the display electrode strips are electrically insulated from the first touch electrode strips and the second touch electrode strips, and overlap with the second touch electrode strips.

9. The in-cell touch display panel according to claim 1, further comprising:
   a plurality of seventh display pixel units, each comprising a seventh metal segment disposed in the metal layer;
   wherein, the first transparent segments of the first display pixel units and the fourth transparent segments of the fourth pixel units form a plurality of first connecting lines; the first metal segments of the first pixel units, the second metal segments of the second display pixel units, and the seventh metal segments of the seventh display pixel units form a plurality of second connecting lines; the second connecting lines cross the first connecting lines.

10. The in-cell touch display panel according to claim 9, wherein each of the first display pixel units further comprises a sixth transparent segment disposed in the transparent layer and a sixth metal segment disposed in the metal layer, each of the fourth display pixel units further comprises a seventh transparent segment disposed in the transparent layer, each of the fifth display pixel units further comprises an eighth transparent segment disposed in the transparent layer, and each of the seventh display pixel units further comprises a ninth transparent segment disposed in the transparent layer; the sixth transparent segments and the sixth metal segments of the first display pixel units, the seventh transparent segments of the fourth display pixel units, the eighth transparent segments of the fifth display pixel units, and the ninth transparent segments of the seventh display pixel units form a plurality of display electrode strips extending along the first direction; the display electrode strips are electrically insulated from the first touch electrode strips and the second touch electrode strips, and overlap with the second touch electrode strips.

\* \* \* \* \*